(12) United States Patent
Matsumoto

(10) Patent No.: US 6,438,455 B2
(45) Date of Patent: Aug. 20, 2002

(54) INDUSTRIAL ROBOT

(75) Inventor: Kazunori Matsumoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/817,218

(22) Filed: Mar. 27, 2001

(30) Foreign Application Priority Data

Mar. 28, 2000 (JP) ........................................ 2000-088017

(51) Int. Cl.$^7$ .............................................. G06F 19/00
(52) U.S. Cl. ........................... 700/245; 700/17; 700/83; 700/110; 700/247; 700/257; 318/567; 318/568; 701/23; 901/3
(58) Field of Search .............................. 700/17, 110, 83, 700/245, 247, 257; 701/23; 318/568, 567; 340/3.7, 3.32; 901/3; 379/112.01; 324/765

(56) References Cited

U.S. PATENT DOCUMENTS

| | | | | |
|---|---|---|---|---|
| 4,078,158 A | * | 3/1978 | Houee et al. | 379/112.01 |
| 4,697,979 A | * | 10/1987 | Nakashima et al. | 180/2.1 |
| 4,835,730 A | * | 5/1989 | Shimano et al. | 700/247 |
| 5,212,433 A | * | 5/1993 | Yasuyuki | 200/1 V |
| 5,241,482 A | * | 8/1993 | Iida et al. | 340/3.32 |
| 5,367,595 A | * | 11/1994 | Jennings et al. | 385/59 |
| 5,402,512 A | * | 3/1995 | Jennings et al. | 385/114 |
| 5,444,342 A | * | 8/1995 | Matsuo et al. | 318/563 |
| 5,751,918 A | * | 5/1998 | Shimogama et al. | 318/563 |
| 6,051,984 A | * | 4/2000 | Huang et al. | 324/765 |
| 6,292,712 B1 | * | 9/2001 | Bullen | 700/17 |

FOREIGN PATENT DOCUMENTS

JP 5-79602 10/1993

\* cited by examiner

Primary Examiner—William A. Cuchlinski, Jr.
Assistant Examiner—McDieunel Marc
(74) Attorney, Agent, or Firm—Wenderoth, Lind & Ponack, L.L.P.

(57) ABSTRACT

An industrial robot not malfunctioning if wiring to the safety device is connected after installation is presented. The robot makes an operator pay attention to that the safety device is set in cancel mode, and is hence safer. In the robot, all input connectors of the safety device wired from the outside are identical connectors. The connector has a terminal for feeding a status aside from a terminal for connecting to the safety device. Depending on status input from the outside, a warning sign is displayed on a display device. The warning sign is displayed only when a controller is operated.

4 Claims, 2 Drawing Sheets

INDUSTRIAL ROBOT

FIELD OF THE INVENTION

The present invention relates to an industrial robot having an input connector for wiring to a safety device from outside.

BACKGROUND OF THE INVENTION

Recently, higher safety of an industrial robot is demanded. Generally, an industrial robot has a safety device for stopping instantly, and an input to the safety device.

Such robot will be explained by referring to FIG. 2. An industrial robot has a safety device for stopping instantly and an input connector 15, which is disposed on a robot controller, of the safety device. The connector is connected from the outside, for example, an emergency stop switch 11, an open/close confirm switch of a safety fence 12, a dead-man switch 13, or a control device 14 of robot to be wired from outside.

These switches are generally input with contacts, having a b-contact, which is normally closed and is opened when pressed.

When the robot and peripheral devices are installed, a peripheral safety fence, an emergency stop switch, and an input wiring to safety device are often installed or wired simultaneously. Or, the input wiring may be connected after the robot is installed. At this time, the safety device is set in the cancel mode where the switch having the b-contact is shorted, and may fail to function.

The installation and wiring of the peripheral safety fence and the wiring of the emergency stop switch must be completed by the time when the robot is ready to work. But the robot may start to operate before the completion, or the robot may work even when set in cancel mode due to a wrong operation by an operator.

SUMMARY OF THE INVENTION

An industrial robot alerting caution to an operator and enhanced in safety is presented. The robot has identical input connectors for safety devices wired from the outside. The connector has a status terminal for feeding a status aside from terminals connected to the safety devices. Depending on the status from the outside, a display device displays a warning sign only during a controller of the robot is operated.

The robot makes the operator pay attention to that the robot works before the completion of installation and wiring of a peripheral safety fence or wiring of an emergency stop switch or in cancel mode due to a human error.

DESCRIPTION OF THE PREFERRED EMBODIMENT

Figure 1:
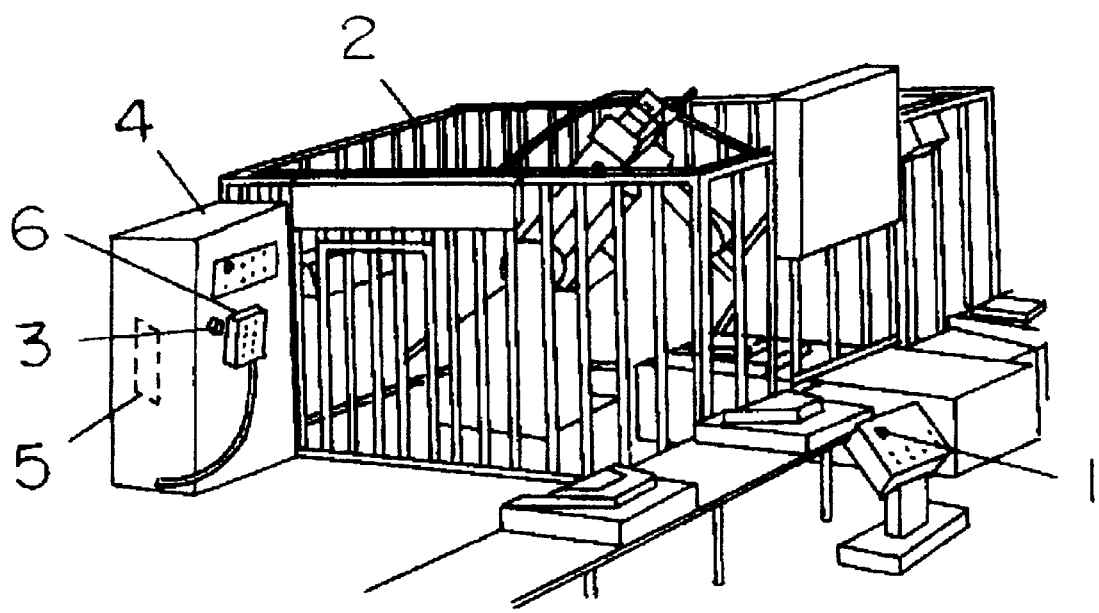
FIG. 1 is a structural diagram of a robot according to an embodiment of the invention.
Figure 2:
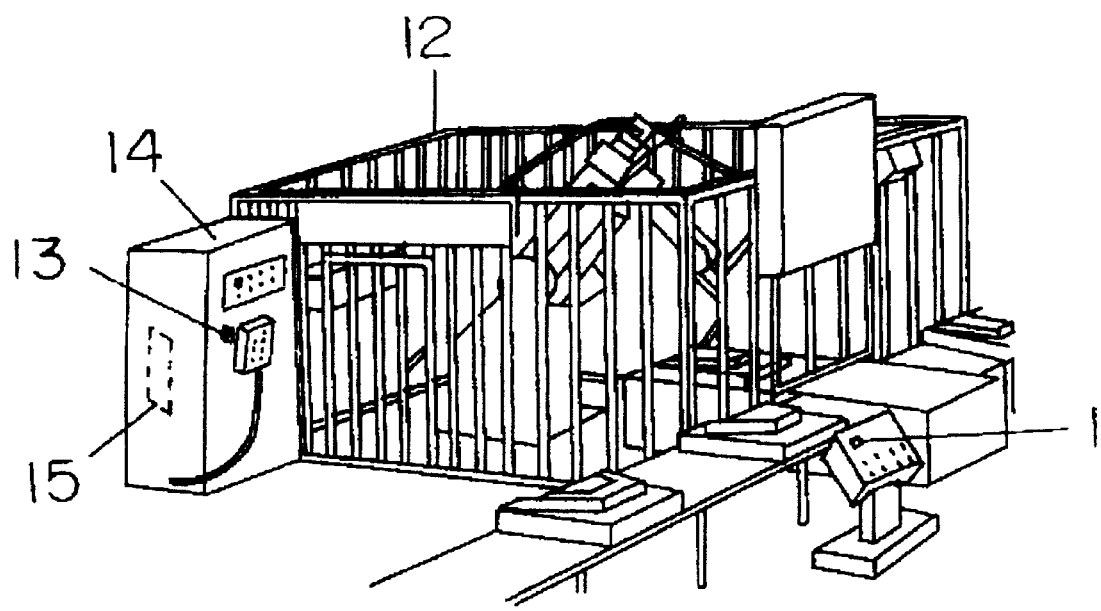
FIG. 2 is a structural diagram of a conventional robot.

An industrial robot according to a exemplary embodiment of the present invention will be explained by referring to FIG. 1.

The robot includes an emergency stop switch 1, a safety fence 2, a dead-man switch 3, a controller 4, a input connector 5 of a safety device, and a display device 6. The input connector 5 has a status terminal for feeding a status aside from terminals connected to the safety device.

When the status terminal is connected (for example, short-circuited), the robot is judged to be normal. If nothing is input to the status terminal, it is judged that the connection between the input connector 5 and one of the emergency stop switch 1, an open/close confirm switch of the safety fence 2, and the dead-man switch 3. As a result, the display device 6 displays a warning sign to make an operator pay attention.

That is, during the installation work of the robot, when the safety device is set in cancel mode, for example for installing the robot, nothing is input to the status terminal (for example, opened). And after the robot is installed, and after the safety device is finished to wire, the status terminal is connected (for example, short-circuited).

If the warning sign is always displayed, the original display function of the display device may be spoiled, and hence it is displayed only during the operation of the controller.

That is, monitoring the display device 6 during an operation, the operator is made pay attention to the warning sign displayed only when the robot is operated. By this function, the robot makes the operator pay attention without sacrificing the original display function.

Further, this status terminal is included in the input connector 5 of the safety device. Therefore, when setting the safety device in cancel mode, or when connecting wiring of the safety device to clear the cancel mode, the operator always handles the connector, and hence is protected from negligence in an operator's work.

What is claimed is:

1. An industrial robot comprising:

a safety device;

plural input connectors connected to said safety device from outside, each of said input connectors comprising a terminal coupled to said safety device, and a terminal for feeding a status;

a display device for displaying a warning signal depending on the fed status; and a controller, wherein the warning signal is displayed only when said controller is operated.

2. The industrial robot of claim 1, wherein said plural input connectors comprise plural identical input connectors.

3. An industrial robot comprising:

a safety device;

plural input connectors connected to said safety device from outside;

a connector, of the same type as said input connectors, comprising a terminal for feeding a status;

a display device for displaying a warning signal depending on the fed status; and a controller, wherein the warning signal is displayed only when said controller is operated.

4. The industrial robot of claim 3, wherein said plural input connectors comprise plural identical input connectors.

* * * * *